United States Patent [19]

Lacrouts-Cazenave

[11] Patent Number: 4,989,483
[45] Date of Patent: Feb. 5, 1991

[54] APPARATUS FOR PUTTING BAR CODES ON A THIN METAL STRIP

[75] Inventor: Joël G. Lacrouts-Cazenave, Neauphle Le Chateau, France

[73] Assignee: Lacrouts Cazenava Sarl, Les Clayes Sous Bois, France

[21] Appl. No.: 477,258

[22] Filed: Feb. 7, 1990

Related U.S. Application Data

[62] Division of Ser. No. 205,450, Jun. 10, 1988.

[30] Foreign Application Priority Data

Jun. 12, 1987 [FR] France ............................ 87 08494

[51] Int. Cl.⁵ .......................... B26D 7/06; B26F 1/04
[52] U.S. Cl. ................................. 83/76.9; 83/50;
83/214; 83/255; 83/571; 83/620; 234/95;
234/98
[58] Field of Search .................. 83/50, 76.9, 214, 255,
83/405, 563, 571, 619, 620; 234/95, 98, 101,
111, 114

[56] References Cited

U.S. PATENT DOCUMENTS

| | | | |
|---|---|---|---|
| 3,449,991 | 6/1969 | Daniels | 83/76.9 |
| 3,673,901 | 7/1972 | Vinson | 83/255 X |
| 4,480,782 | 11/1984 | Morishima | 83/571 X |
| 4,650,114 | 3/1987 | Salvagnini | 234/114 |
| 4,790,226 | 12/1988 | Tsuchida | 83/255 X |

FOREIGN PATENT DOCUMENTS 2420544 11/1975 Fed. Rep. of Germany ........ 83/255

Primary Examiner—Paul A. Bell
Attorney, Agent, or Firm—Herbert Dubno; Andrew Wilford

[57] ABSTRACT

An apparatus for putting on a thin strip a bar code consisting of a plurality of parallel thin and wide bars of respective thin and wide widths and a plurality of thin and wide spaces separating the bars has a plurality of stations spaced apart along a transport path extending in a transport direction and each having a respective group of tools of the relatively thin width, the tools of each station being immediately juxtaposed with one another in the direction. The strip is stepped in the direction along the path through the stations and only selected ones of the respective tools are selected and moved by actuators down into the strip. A controller is connected to the selector and actuator unit and to the transporter for forming each of the thin bars by pressing into the strip a one of the tools. The wide bars are formed by first pressing into the strip at an upstream one of the stations another one of the thin tools to form a respective partial wide bar, then displacing the strip downstream to the next station and pressing into the strip immediately adjacent the partial wide bar at the next downstream station another such thin tool having the relatively thin width to widen the partial wide bar. These last two steps are repeated at succeeding downstream stations until the partial wide bar is of the relatively wide width.

10 Claims, 6 Drawing Sheets

APPARATUS FOR PUTTING BAR CODES ON A THIN METAL STRIP

This is a divisional of co-pending application Ser. No. 07/205,450 filed on June 10, 1988.

FIELD OF THE INVENTION

The present invention relates to a process and device for producing labels, especially metal labels of the double classification type and comprising information coded by bars. The invention also relates to labels produced by the process.

BACKGROUND OF THE INVENTION

Pressed and/or cut metal labels are more resistant to heat or chemical and mechanical attack than, for example, are labels on plastic or paper media or even printed metal labels.

The production, assembly and packaging of products on a fully automated line, and successive treatments and the controls concerning these different operations require positive identification of these products so as to be able to continuously locate them and sort them. This specific identification must resist the high temperatures of certain treatments, soakings in different types of baths, etc. Such identification must be easily recognized by anyone via various reading processes (laser, sight, etc) and at any point of the processing line without any special handling being required.

OBJECT OF THE INVENTION

The object of this invention is to provide a process and device which can quickly, safely and economically produce metal labels of a new type resistant to most treatments to which parts fitted with these labels are likely to be subjected during production, when being assembled or being treated, for example on an automated chain, and especially metal labels able to comprise information coded by bars.

SUMMARY OF THE INVENTION

The bar code is well known. Information coded by bars appears in the form of a series of full parallel bars of different widths separated by spaces of different widths.

Accordingly to this invention, a process for machining a ribbon of material with the aim of obtaining labels comprising information coded by bars includes the following steps:
   dividing the series of parallel bars and spaces comprising the information coded into a series of rectangles, referred to herein as calculation rectangles, which are equal and parallel, roughly having the same length as the bars, so that, after marking the surface with the calculation rectangles, the series of rectangles re-forms the desired series of bars and spaces;
   classifying the series of calculation rectangles, marked or otherwise, into several complementary series by superposition, i.e. so that their superposition allows for forming of the desired series of bars and spaces of the coded information and so that none of the complementary series comprises marked rectangles which are spaced with a distance less than a predetermined distance;
   machining the material ribbon in several successive overlays each corresponding to one complementary series according to rectangles, known as machining rectangles, corresponding roughly to the marked calculation rectangles of the complementary series, so as to have appear by machining on the ribbon the coded information as and when the overlays are all completed.

The process according to the invention thus differs from known processes in that each overlay corresponds to an operation complementary to the others, each part being produced by a set of elementary tools and differing from the previous one.

Machining may be effected by means of a machine fitted with a set of elementary tools that are all of the same size adapted to the dimensions of the machining rectangles.

In one embodiment of the invention, machining of the ribbon consists of cutting it according to the machining rectangles, i.e. according to the coded information bars so as to obtain labels with recessed bars. In order to obtain this aim, the machine may be a press and the elementary tools are tools in the press, such as rectangular cutting punches having the same cross section dimensions as the machining rectangles. It is then a particular advantage to provide for a small covering width or overlap so that no material remains between two adjacent punched holes formed during different machining overlays. This overlap width, however, will have to be as small as possible and in any event take into account bar-code legibility and precision tolerances. Moreover, the predetermined minimum distance to be observed between rectangles of a given complementary series is, in this instance, determined in particular by the spatial requirement of each elementary tool or punch. It is an advantage according to the invention to carry out several machining operations simultaneously on the same press, this press then needing to be fitted with an adequate number of sets of elementary tools.

According to this invention, a device for machining a material ribbon includes the following elements:
   a ribbon feed device;
   a press device;
   at least one set of elementary tools in the form of punches able to be activated by the press device to machine the material ribbon upon being actuated by means of shims; and
   a central control processing unit which controls machining by selectively inserting shims between each of the tools and the press device brought into play by means of shim positioning means prior to any action of the press device on the tools by means of the shims in order to machine the ribbon.

The shim positioning means may comprise:
   shim-displacement means acting on several shims at the same time by means of travel compensation devices such as springs; and
   a shim-blocking device to prevent a shim from moving between the press and its tool on operation of the shim-displacement device associated with it.

The displacement means may comprise fluid jacks or electromechanical solenoids.

Advantageously the mechanical press is fitted with several sets of tools aligned along the path of the ribbon so as to be able to machine in several overlays each different complementary series by virtue of the different arrangements of the shims, one per overlay for each of the sets of tools. The feed device comprises a reel and a stepping device for advancing the material ribbon. It is then possible to simultaneously machine several labels or ribbon segments.

In one embodiment of the invention, the device is used to produce metal labels which, according to the invention, include a number coded by bars cut from a metal ribbon or strip followed by its alphanumeric expression, for example in Arabic characters, pressed into the metal ribbon. The device then also includes a pressing unit activated by the press, the various numeric characters being embossed by a pressing wheel which is pressed into the ribbon after selection by the central processing unit of the desired numeric character. In this embodiment, the tools are cutting punches which cut the ribbon. It is an advantage for the bars and the spaces of the bar code to be classified first as explained above in the general description of the process of the invention. One thus obtains double classification strip comprising a number coded by bars and an alphanumeric classification.

According to one variant, the device has the advantage that it also includes a quality-control station for machining the material ribbon and a station for marking segments of the ribbon and deemed to be defective following quality-control. This control station may comprise a camera connected to the central control processing unit and operated to scan the material ribbon after machining under suitable lighting.

For the production of double classification labels, especially for bars and alphanumeric classification, control may consist of checking agreement between the two expressions of a given item of information, its alphanumeric expression and its expression coded by bars.

In one embodiment of the invention, the camera is linear and scans the label ribbon thus produced along at least one parallel longitudinal axis for the reading. The alphanumeric code character font is then selected according to the invention so that each numeric character can be recognized by its intersections with the scanning longitudinal axis or axes. If there is a defect on a label, the central processing unit orders the marking of the defective label for it to be machined again.

BRIEF DESCRIPTION OF THE INVENTION

The above and other objects, features and advantages of my invention will become more readily apparent from the following description, reference being made to the accompanying highly diagrammatic drawing in which.

SPECIFIC DESCRIPTION

Figure 1:
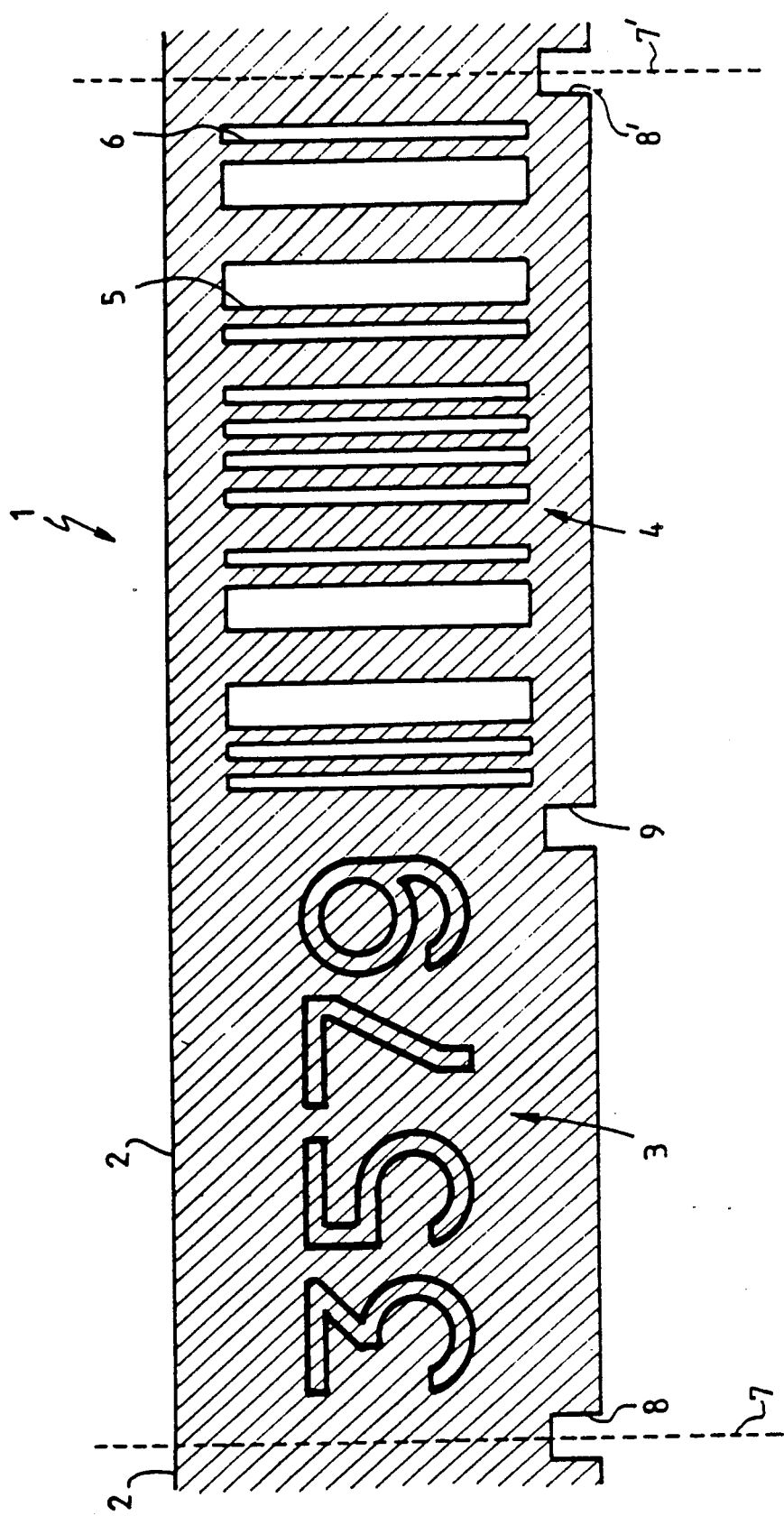
FIG. 1 is an elevational view which shows a label according to the invention.

In FIG. 1, a label 1 according to the invention is shown in the form of a metal strip segment 2 carrying two expressions of a given number: its alphanumeric expression 3 and its expression coded by bars 4. The alphanumeric expression 3 is pressed and thus appears embossed or recessed, whereas the expression 4 coded by bars is cut, the bars corresponding to wide or thin elongated rectangular holes 5 or 6 made in the ribbon or strip 1. In FIG. 1, the actual label is delimited by imaginary transverse lines 7 and 7' respectively passing through delimitation notches 8 and 8' made on the edge of the ribbon 1 for the marking of the labels when they have still not been separated from each other.

A central notch 9 similar to the delimitation notches 8 and 8' appears on certain labels, for example those having a defect, so as to differentiate them from the others.

The label is thus metallic, cut from a thin steel strip, e.g. from 0.1 to 0.2 mm thick, and comprises two identical numbers written in two different codes:

a cut bar code 4 read by special equipment, and embossed numeric characters 3 read by processing line operators.

The numbers may be replaced by alphanumeric words.

In order to produce in series labels such as the label 1 described above, it has proved advantageous to produce these by means of a mechanical press equipped with cutting punches and pressing tools.

Figure 2A:
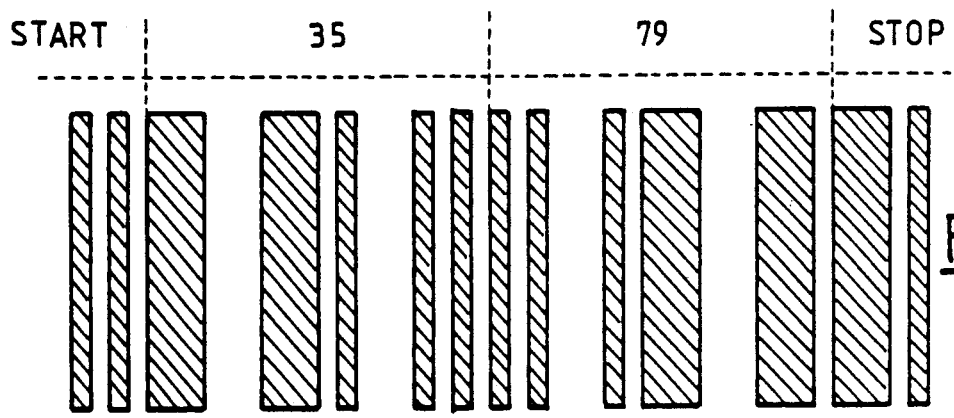
FIGS. 2a to 2c are diagrams which show the classification of a bar code according to one of the steps of the invention process.
Figure 2B:
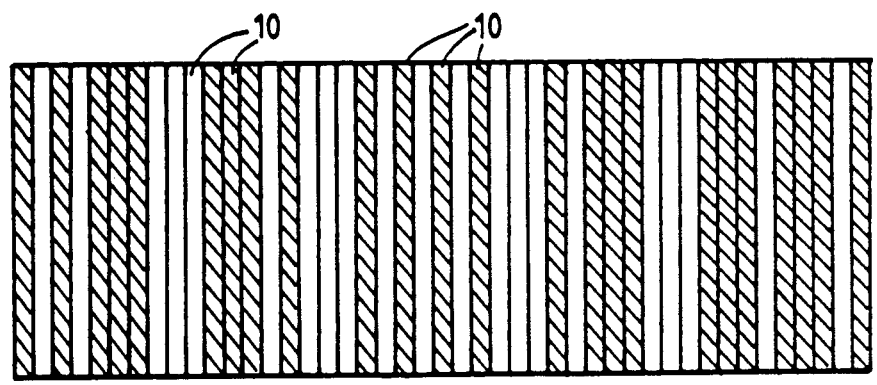
Figure 2C:
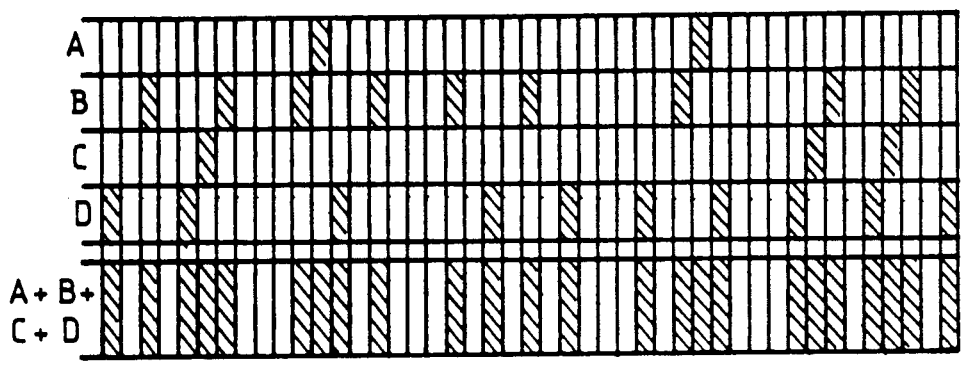

In order to simplify the tooling required for cutting the bar coded number, according to the invention the procedure is as follows: FIGS. 2a to 2c illustrate the prior processing of the number 3579 coded by bars. This case refers to the bar code known as "2 from 5 entwined" composed of wide bars (WB), thin bars (TB), wide spaces (WS), and thin spaces (TS). As appears in FIG. 2a, the series of bars and spaces always contains start information (TB-TS-TB-TS) at the code start and stop information (WB-TS-TB) at the code end. A wide bar (WB) and a wide space (WS) have the same width which is equal to the width of three thin bars (TB) or three thin spaces (TS), namely as regards their respective widths: (WB)=(WS)=3(TB)=3(TS). It is therefore possible to divide the series of parallel spaces and bars comprising the information coded into a series of rectangles 10, referred to as calculation rectangles, that are equal and parallel, roughly having the same length as the bars so that, after surface marking of certain of the calculation rectangles 10, the rectangles together form the desired series of bars and spaces as illustrated on FIG. 2b. Each rectangle has the width of one thin bar or thin space.

Next, the process of the invention provides for the classification of the series of calculation rectangles 10, possibly marked into several complementary series A, B, C, and D each being superposed so that their superposition enables the series of bars and spaces with the coded information to be formed and so that none of the complementary series includes any calculation rectangles spaced by a distance less than a predetermined distance. In the case of this example, this predetermined distance, which, apart from other things, depends on the punches spatial requirement factors, is between twice and three times the width of one rectangle. Once this classification is made, it is possible to cut the material ribbon with several successive overlays, each corresponding to a complementary series A, B, C, or D according to the machining rectangles corresponding roughly to the rectangles 10 identified by the complementary series A, B, C, and D so as to have appear by cutting on the ribbon the bars of the coded information as and when the overlays are applied.

So as to avoid the risk of leaving material between two cuttings when punching a wide bar, the machining rectangles are wider than the calculation rectangles while remaining centered on the calculation rectangles so as to be very slightly overlapped inside a given wide bar from one overlay to the other by an overlapping width.

In an application example of this process, the calculation rectangles have a width of 0.42 mm corresponding to the bar code pitch and the machining rectangles have a width of 0.44 mm for 8 mm of length corresponding to the width of a cutting punch, namely 0.02 mm of overlapping width for the wide bars. The 0.44 mm punches cut the ribbon according to the division pitch, namely 0.42 mm, and are centered on the marked calculation rectangles, namely an overlap of 0.01 mm on both sides of the marked rectangle. Thus, once the ribbon is cut, the following widths are obtained:

thin bars (TB): 0.44 mm,
wide bars (WB): $(0.44 \times 3) - (2 \times 0.02) = 1.28$ mm,
thin spaces (TS): $0.42 - (2 \times 0.01) = 0.40$ mm,
wide spaces (WS): $(0.42 \times 3) - (2 \times 0.01) = 1.24$ mm.

Of course, these dimensions conform to the reading and legibility tolerances of the bar code.

Figure 3:
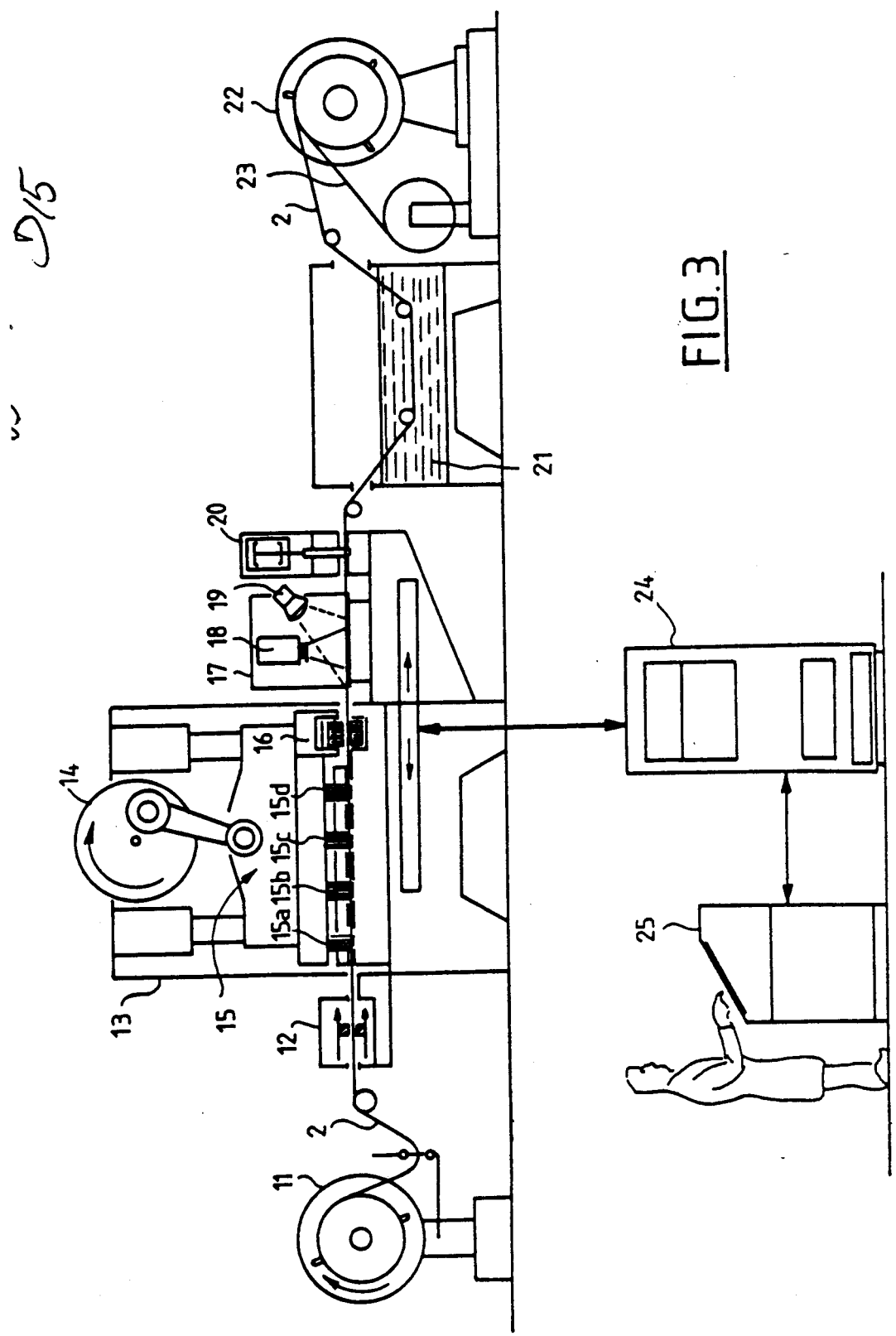
FIG. 3 is a diagrammatic representation of an automatic label production line according to the invention.

FIG. 3 shows an installation for producing labels according to the invention. This apparatus includes:

- a support steel strip or metal ribbon feed device 2 mainly comprising a supply reel 11 and a stepping device 12 for advancing the metal ribbon 2;
- a mechanical press 13 which is driven by an eccentric 14 and on which are successively mounted in the moving direction of the ribbon 2 along the path thereof:
  the stepping advance device 12;
  a tool 15 for cutting the bar code comprising 4 cutting stations 15a, 15b, 15c and 15d each provided with a set of cutting punches each in turn independently activatable according to the requirement of the cutting to be made in the ribbon by means of shims or keying pull cords (not shown here) moveable and possibly interposed between the punches and the press;
  a wheel pressing unit 16 for Arabic characters;
  a visual control station 17 having a camera 18 with lighting 19;
  a notching unit 20 for labels having a defect;
- a bath 21 for cleaning the ribbon 2;
- a takeup device or winder 22 for the cut, pressed, notched and cleaned ribbon 2, this advantageously being done between turns of paper 23;
- a central processing unit 24 connected to the press and controlling all the operations, such as cutting by activating or not activating each of the different punches of each cutting station 15a, 15b, 15c and 15d by means of the shims or pull cords, as well as, in particular, pressing and notching from a predefined cutting program entered into a memory connected to the central processing unit 24;
- an operator console 25 connected to the central processing unit 24 enabling the entry of information corresponding to a cutting program and allowing control of the course of operations. A printer may be connected to the console 25 to enable editing of operating messages.

In this embodiment of the invention, the various stages of the process are the following per production cycle:

(a) advance of a metal strip 2 by a distance corresponding to a label length by means of the stepping advance device 12;

(b) possible independent activations of the bar code cutting punches on each of the work stations 15a, 15b, 15c and 15d controlled by the central processing unit 24;

(c) incremental setting of the pressing wheels of the number pressing unit 16;

(d) verification of all the positions for authorization of the press cycle;

(e) cutting and forming according to these positions;

(f) visual control of the correspondence of the two expressions, coded by bars and alphanumeric, of the number of the last cut and pressed label by the central processing unit 24 according to the signals the camera 20 sends to it;

(g) possibly notching of a label by the notching unit 20 if it is defective;

(h) a calculation of the next label to be generated by the central processing unit 24;

(i) continuous winding without tension of the labels already formed by the winder 22.

The quality control of the last label and its notching in the event of a defect, as well as calculation of the next label, can be carried out during the pressing and cutting stage.

FIGS. 2a–2c and FIG. 3 make evident that the various complementary series A, B, C and D of the rectangles correspond to the different and complementary overlays for machining a given label. When the device of FIG. 3 produces labels continuously by machining a material ribbon, the program is executed as follows according to the successive press cycle:

1st cycle: the first label is cut according to its complementary series A at the station 15a;

2nd cycle: the first label is cut according to its series B at the station 15b and the second according to its series A at the station 15a;

3rd cycle: the first label is cut according to its series C at the station 15c, the second according to its series B at the station 15b and the third according to its series A at the station 15a; and 4th cycle: the first label is cut according to its series C at the station 15d, the second according to its series C at the station 15c, the third according to its series at the station 15b and the fourth according to its series A at the station 15a, and so on.

During the fourth press cycle, the first, second, third and fourth labels are respectively cut 100%, 75%, 50% and 25%, that is they are that much complete.

Initialization of the system is carried out during a stop at the top dead center without the need for any special protocol, the initial state being any, depending of the requirement on the user, and is transmitted by the console in the form of the first number or word to be generated.

Continuous quality control of the label may be effected by one or more linear cameras 18. The central processing unit 24 sends it the number to be recognized. The camera 18 compares it to the two codings of the label and sends its reading to the central processing unit 24 along with a message with any possible error code.

Reading is made on a lit station immediately downstream of the press. Visual accuracy is doubled possibly with two cameras to avoid errors concerning recognition of the numeric characters and detect breakages of punches where they are most likely to occur, especially at the extremities. The recognition of numeric characters is generally not directly possible with linear cameras. The pixel (smallest image element able to the analyzed) is 0.1 to 0.2 mm. Accordingly, for each numeric character, it will suffice to accurately scan a significant zone which will enable the pressed-in numeric character to be recognized. To guarantee reading, the character is read on its recess side so as to have a perfect shadow under glancing light.

To avoid additional codification or classification, the alphanumeric characters of the code 3 are defined in a rectangular matrix where one or more reading lines are defined. Each character cuts this line at one point different from the others. Each character thus is recognizable with a single significant zone of some tenths of millimeters, the reliability of this process residing in the positioning precision of the character to be recognized. Where the character definition matrix needs to be reduced for reasons of spatial requirement, recognition on two lines enables four significant recognition points to be used instead of two. This process can be applied to signs which are more complex than characters (e.g. alphabetic characters) without any special preparation being required other than slight deformation of these signs.

Figure 4:
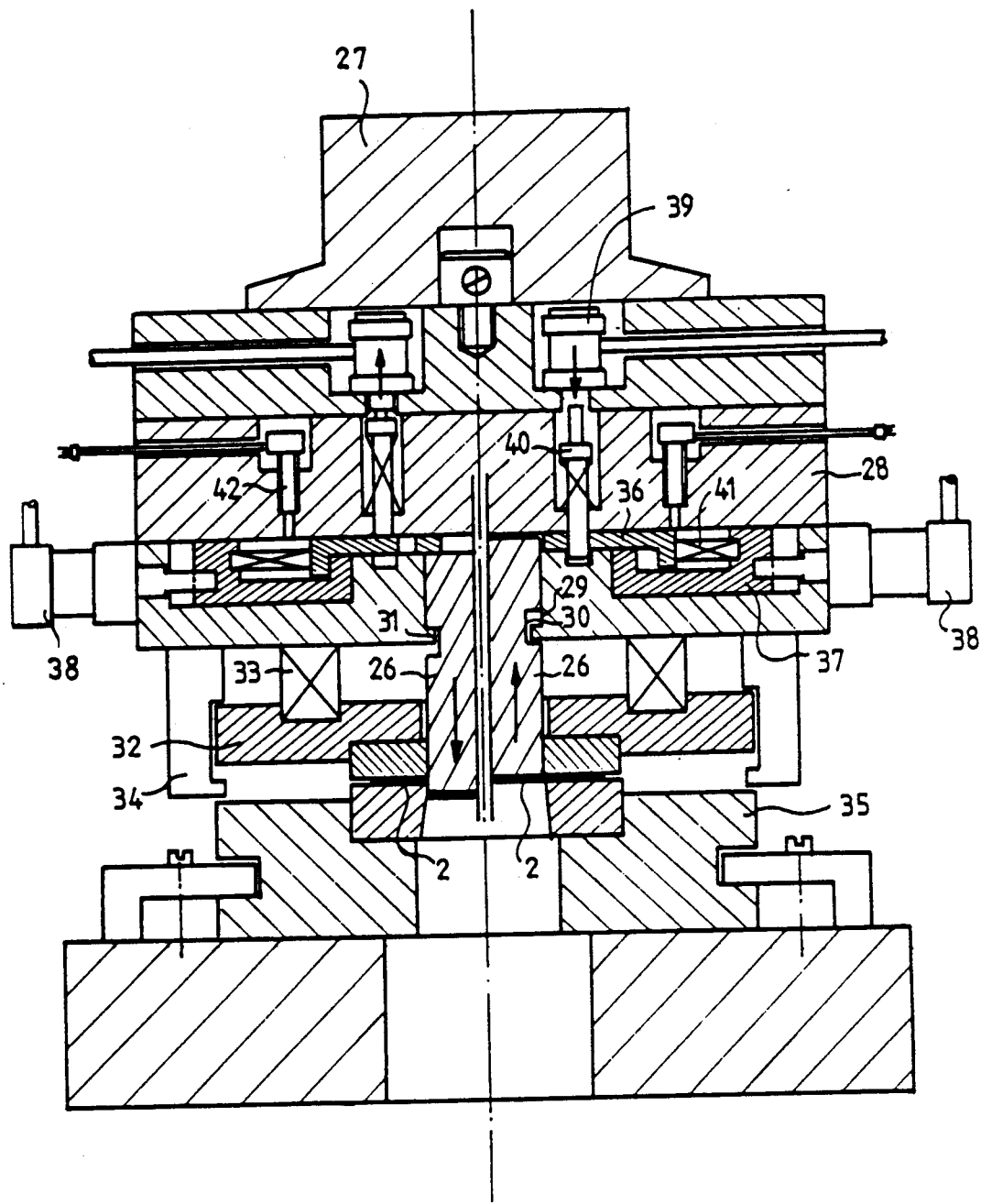
FIG. 4 is a diagrammatic section in half-views taken on a vertical plane, of a press equipped according to the invention, in two configurations seen in respective halves of the figure.

The cutting punch activation process will be understood better by referring to FIG. 4 which is a diagrammatic lateral section of the press around the punches when the press operating member 14 is at the bottom dead center. FIG.4 is divided into a left part and a right part which respectively correspond to a configuration in which the punch 26 represented is activated and another one in which it is not activated.

From FIG. 4 it is possible to recognize the various elements making up a press, namely the press plunger 27 that is integral with a punch plate block 28 so as to be able to print on it displacements along a vertical axis. It is also possible to recognize in FIG. 4 the blank press block 32, the blank press spring 33 and the blank press non-return device 34, as well as the matrix block 35.

Figure 5:
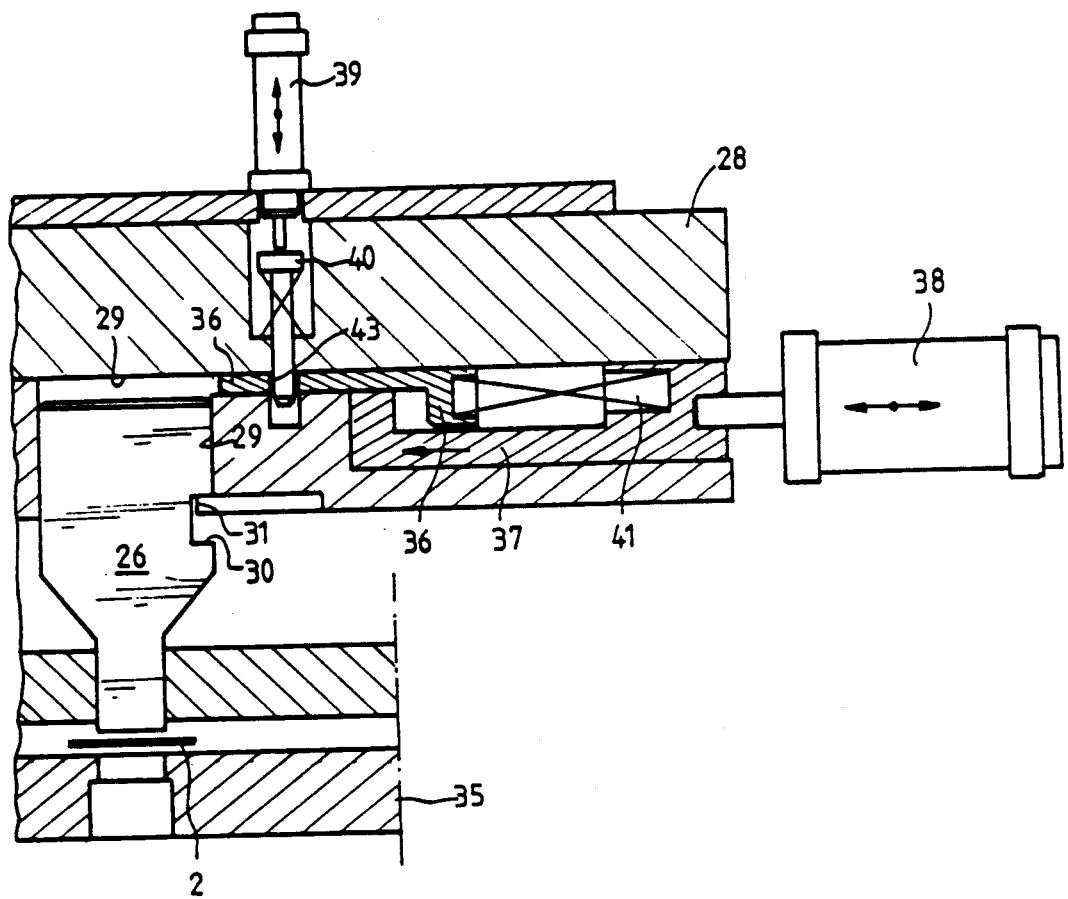
FIG. 5 is a partial section similar to that of FIG. 4, but on a larger scale and illustrating the functioning of a press similar to that of FIG. 4.

FIG. 5, which is a close-up view similar to FIG. 4, shows the press at the bottom dead center position. The punch 26 is in a housing 29 which only permits a single vertical translation degree of freedom on a certain height defined by a notch 30 in the punch which fits vertically around a catch or abutment 31 of the housing.

A shim or pull-knob 36 is provided inside the punch plate block 28 so as to be able to move in translation along a horizontal axis between a rear or outer position and a front or inner position. In the front position, the front extremity of the shim 36 blocks the punch 26 in the low position in its housing 29 by placing itself between its head and the upper part of its housing 29, as shown on the left part of FIG. 4, i.e. when the punch is active. In this part of FIG. 4, the metal ribbon 2 has just been cut by the punch 26. In the rear position, the shim 26 does not prevent the punch from moving inside its housing 29 and when the press plunger drops at the bottom dead-center position, the punch 26 rests on the metal ribbon 2 by virtue of its own weight but the ribbon is not cut as shown on the right in FIG. 4, i.e. in the configuration where the punch 26 is not active.

The activation of each punch is thus made twice for best reliability and precision. The principle is that each punch 26 has in its housing 29 a degree of translation freedom and is active when this freedom is blocked by a shim or pull knob 36; when it is not active, the punch comes to just rest via its own weight of a few grams on the steel strip at the press bottom dead-center position. The shims are positioned in relation to the punch by an activation drawer 37 common to several pull knobs 36. The drawer is controlled by an average-power jack 38.

To this activation drawer 37 are hooked pull knobs 36 which block the heads of the selected punches 26. The selection mode is carried out for each pull knob by small indexing electromagnet jacks or actuators 39 moving slugs or indexing rods 40 which free the pull knobs 36 by preventing them from moving in relation to the punch plate block 28. As the pull knobs 36 are linked to the drawer 37 by respective compression springs 41, when this spring moves into a front position, only the pull knobs not stopped by their respective indexing slugs 40 come and slide above the respective punches 26. In this example, each indexing slug 40 is a rod which slides into the punch plate block 28 and which blocks the pull knob associated to it by holding itself in a hole 43 made in this pull knob, the longitudinal axis of the rod preferably being perpendicular to the translation axis of the pull knob. Following the press cycle at the top dead-center position, the drawer 37 is moved forward and the slugs, pull knobs and consequently the punches are selected. From the bottom dead center, the activation drawer 37 returns to the rear position returning all the pull knobs via the hooking notch 30. The indexing slugs 40 are also returned and instantaneously reselected for the next number. The activation jack 38 takes again its front position by pushing all the pull knobs which do not encounter any obstacle caused by the indexing slugs. In the contrary case, the compression springs 41 between the pull knobs 36 and the drawer 37 are compressed. The position of each pull knob 36 is checked by means of an optical fiber probe 42 (FIG. 4) connected to the central processing unit 24.

The invention device is reliable because:
the strokes of the moving elements 26, 36, 37, 40 . . . are very small;
the movements of the parts are in straight without any risk of skewing,
the positions of the pull knobs 36 are controlled;
the cutting forces are borne by the shearing working elements; and
the actuating jacks 38, 39 bear no force other than that required for the movement of parts and the reactions of the springs.

Figure 6:
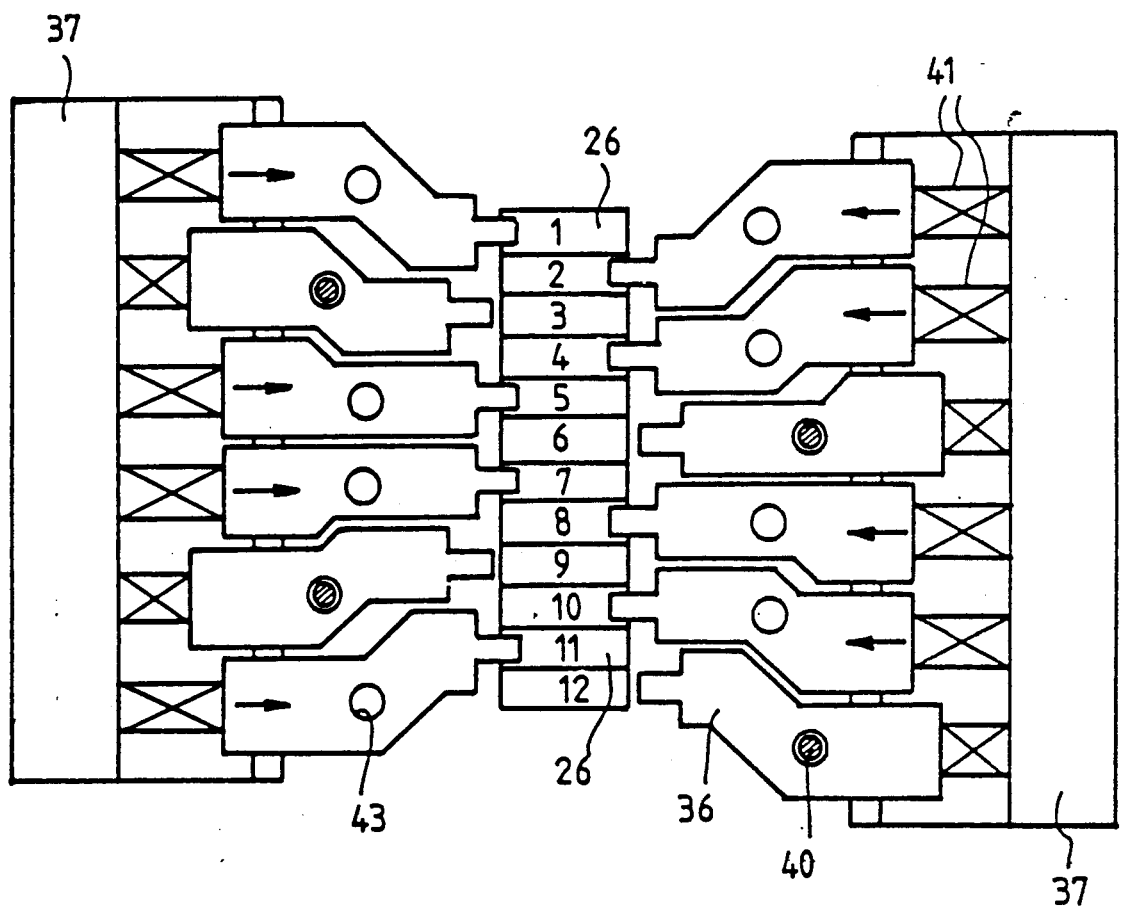
FIG. 6 is a partial diagrammatic two-dimensional view showing a set of shims for a press similar to the one of FIG. 4.

FIG. 6 shows a set of pull knobs 36 and cutting punches 26 viewed from above with two activating drawers 37 situated across from each other, one for each of the set punches 26. The drawers are in the front position and have moved the free pull knobs by means of the travel compensation springs 41. The free pull knobs are those which are not blocked by the indexing rods 40 passing through their holes 43; they have their front extremity above the head of the associated punch 26. On the other hand, the pull knobs blocked by the indexing rods 40 provoke compression of their respective travel compensation springs 41 and leave free the heads of the punches associated to them. When the press plunger lowers, only the punches overlapped by a pull knob extremity or shim 36 will cut the metal ribbon.

One can see that it is therefore possible to implement the process of the invention by means of the device described in the mentioned drawings in order to produce labels according to the invention. Indeed, the division and classification of the bar code into rectangles, possibly marked according to the invention, are well-adapted to the use of identical rectangular punches which can be activated independently under a given press.

According to the invention, the press may be regarded as a computer peripheral just like a printer. Indeed, its architecture and operating principle allow for the activation of the punches in a completely random way. The number of possible combinations depends on the number of effective punches, as if n is the number of punches, the number of combinations is $2n-1$.

These punches are not necessarily cutting ones. They may be raising embossing or die stamping punches and generally are dependent on any technique applicable to working with sheet metals on a mechanical press. Their command mode allows for modulation of the adjustment of forms upon demand (embossing depth, die stamping thickness, cutting surface, angle or raising radius, etc). It thus allows for an adjustment according to two dimensions between each press stroke without the need for manual intervention.

Quickness is obtained by the strokes of very short jacks with very low inertia. By way of example, the selection jacks may reach 500 to 600 strokes per minute in the previously described conditions.

The precision and exactness of the processes employed, when once defined, make it simple to install and multiply them. As regards the bar code cut from a metal strip blank, this seems to be an important requirement for the industrial sectors, such as the automobile, electromechanics, radio/television, electrical equipment industries where assembly and production cycles are particularly automated.

Finally, the invention is of course not merely restricted to the modes of embodiment shown and described earlier, bat on the contrary covers all the technical equivalents and variants of these.

What we claim is:

1. An apparatus for putting a bar code on a thin strip, the bar code consisting of a plurality of parallel thin and wide bars of respective thin and wide widths and a plurality of thin and wide spaces separating the bars, the apparatus comprising:
    a plurality of stations spaced apart along a transport path extending in a transport direction and each having a respective group of tools of the relatively thin width, the tools of each station being immediately juxtaposed with one another in the direction;
    transport means for displacing the strip in the direction along the path through the stations with a stop at each station;
    respective selector and actuator means at the stations for pressing only selected ones of the respective tools down into the strip thereat; and
    control means connected to the selector and actuator means and to the transport means for
    (a) forming each of the thin bars by pressing into the strip a one of the tools; and
    (b) forming each of the wide bars by
        ($b^1$) pressing into the strip at an upstream one of the stations another one of the thin tools to form a respective partial wide bar,
        ($b^2$) displacing the strip downstream to the next station,
        ($b^3$) pressing into the strip immediately adjacent the partial wide bar at the next downstream station another such thin tool having the relatively thin width to widen the partial wide bar, and
        ($b^4$) repeating steps b2 and b3 at succeeding downstream stations until the partial wide bar is of the relatively wide width.

2. The bar coding apparatus defined in claim 1 wherein each of the slides is displaceable in a punch direction transversely of the transport direction, the actuator means including for each group of slides a pusher block displaceable in the punch direction and engageable with the slides, the selector means including for each slide a respective shim displaceable transversely between a selected position between the pusher block and the respective slide and a deselected position out from between the pusher block and the respective slide.

3. The bar coding apparatus defined in claim 2 wherein the selector means includes for each group of shims a respective activation drawer displaceable transverse to the punch direction and engageable with the respective shims to move same between the respective positions.

4. The bar coding apparatus defined in claim 3 wherein each shim is provided with a respective spring braced between itself and the activation drawer and urging the respective shim into the selected position.

5. The bar coding apparatus defined in claim 4 further comprising for each shim a respective indexing rod engageable with same in the respective deselected position to block movement into the selected position.

6. The bar coding apparatus defined in claim 5 wherein the selecting means includes a respective actuator for each indexing rod.

7. The bar coding apparatus defined in claim 5 wherein each actuator rod is displaceable parallel to the punch direction.

8. The bar coding apparatus defined in claim 7 wherein each shim is formed with a hole aligned in the respective deselected position with the respective actuator.

9. The bar coding apparatus defined in claim 1, further comprising
    means at one of the stations for marking the strip with an alphanumeric code.

10. The bar coding apparatus defined in claim 1 wherein the slides are punches pushed completely through the strip.

* * * * *